Patented Aug. 5, 1947

2,425,248

UNITED STATES PATENT OFFICE 2,425,248

PRODUCTION OF 2-AMINOPYRIMIDINE

Erwin Kuh, New Brunswick, and Thomas W. Clapper, Martinsville, N. J., assignors to American Cyanamid Company, New York, N. Y., a corporation of Maine No Drawing. Application February 3, 1945, Serial No. 576,146

5 Claims. (Cl. 260—251)

This invention relates to an improved process for the manufacture of 2-amino-4-chloropyrimidine and/or the reduction product thereof, 2-aminopyrimidine.

These products are useful as intermediates in the production of sulfanilamidopyrimidines. 2-amino-pyrimidine, which is obtained from 2-amino-4-chloropyrimidine by reduction, as for example with zinc dust, may be condensed with acetylamino- or nitrobenzenesulfonyl halides to yield products which in turn are readily converted into sulfanilamidopyrimidines. These latter have proved to be chemotherapeutic compounds of great value in the treatment of infectious diseases.

In the past 2-amino-4-chloropyrimidine has been prepared on a laboratory scale by refluxing isocytosine with a large excess of phosphorus oxychloride. This process, while capable of producing the 2-amino-4-chloropyrimidine, is not particularly efficient and is open to many procedural disadvantages, particularly when an attempt is made to operate it on a large scale. The results may be improved by using isocytosine sulfate as proposed by English in U. S. Patent No. 2,224,811 but even this process is not satisfactory for commercial production.

In order to improve the efficiency of the operation, it has been proposed to react the isocytosine or (isocytosine sulfate) with the phosphorus oxychloride in the presence of sulfuric acid monohydrate. Theoretically, this should provide a simple straight-forward reaction using a reduced amount of phosphorus oxychloride, the proportions required being about 1.5 mols of $POCl_3$, 1.0 mol of isocytosine and about 0.25 mol of sulfuric acid monohydrate.

Unfortunately, in practice the process is subject to a number of difficulties. First of all, the rate of chlorination is not practical except at temperatures approaching 90° C. At 87° C., however, a violent exothermic reaction takes place, so violent that the process cannot be practically controlled. Once the violent exothermic reaction is over, the temperature must be maintained at 90° C. by heating in order to accomplish the chlorination. In addition to the impracticability of controlling the initial exothermic reaction, the product obtained is in the form of a hard glassy cake which, from a practical point of view, is very difficult to handle in subsequent operations. Nor is the yield as good as may be desired.

In order to overcome these difficulties, Hultquist and Kuh proposed in United States Patent No. 2,268,033, a process using only the 1.5 mols of phosphorus oxychloride, but catalyzing the reaction by the use of chlorosulfonic acid. This process was more acceptable from a commercial point of view since it enabled the use of a small amount of phosphorus oxychloride, did not exhibit the initial violent exothermic reaction which occurred when using sulfuric acid, and did not require the provision for excessive cooling facilities. The reaction may be carried out smoothly and apparently in good yield.

Nevertheless, this process is also subject to certain disadvantages. It requires about 0.25 mol of chlorosulfonic acid per mol of isocytosine for the best results. Chlorosulfonic acid, while permitting the operation of a much smoother reaction, introduces a number of difficulties. The use of chlorosulfonic acid presents a particularly serious corrosion problem, requiring the careful use of expensively-lined apparatus. A further operational difficulty is met in the fact that all the isocytosine cannot be added in a single batch, an unfortunate feature because of the disagreeable physiological effects of phosphorus oxychloride. Sulfonation of isocytosine, which occurs as one of the side reactions which result from the use of chlorosulfonic acid, decreases the yield, reduces the overall efficiency of the reaction, and interferes seriously with the subsequent dechlorination of the 2-amino-4-chloropyrimidine with the zinc dust ordinarily used for that purpose. The final yield of 2-aminopyrimidine, therefore, is not particularly good on the basis of the isocytosine used.

It is therefore an object of the present invention to provide a process whereby sulfuric acid monohydrate may be used as the catalyst without being obliged to take undue operating precautions. It is also the object of the invention to provide a process whereby a reduced amount of sulfuric acid monohydrate may be used, thereby greatly improving the efficiency of the process by reducing the amount of sulfonated products formed, eliminating the effect of the latter on the zinc dust, enabling the use of less zinc, and providing a much better yield of 2-aminopyrimidine per mol of isocytosine than can be obtained when using chlorosulfonic acid.

In general, these desired objects are readily accomplished simply by retaining part of the previous batch in the reaction vessel and adding thereto the materials to be reacted. The unreacted components are added with agitation, usually at a temperature of from about 50–60° C. The temperature is then immediately raised by heating to between about 90–95° C. and maintained at that temperature until reaction is complete. In normal operation, this requires about 1 to 1½ hours, depending upon the size of the batch.

While this procedure appears to be simple, it does involve several noteworthy features. First of all, it is in no sense a recycling of mother liquors to obtain a greater yield. The portion which is retained in the kettle is substantially fully reacted and if the intention is simply to increase the yield from the reacted batch, the retained portion could be discharged and the 2-amino-4-chloropyrimidine separated therefrom.

Nor is retaining this portion in the kettle simply the use of a diluent to provide a cooling effect to overcome the exothermic reaction. That this is so is shown by the fact that the desired result is not obtained when using a very large excess, several times the normal amount, of phosphorus oxychloride. Nor is the same effect obtained when using a neutral diluent such as toluene. Use of such diluents does not control the exothermic heating nor prevent the formation of the hard glassy product which was noted above to be the form in which the product is obtained when no previously-reacted material is used.

Instead, according to the present invention, it has been found that the reaction between isocytosine and phosphorus oxychloride is not catalyzed by the sulfuric acid monohydrate but is catalyzed by some reaction product produced by the initial violent exothermic reaction obtained when sulfuric acid, isocytosine and phosphorus oxychloride are heated. The exact chemical nature of this material is not definitely certain and does not appear to be readily discoverable. For the purposes of the present invention, it is therefore referred to as the "acid-formed" catalyst.

The modified procedure of the present invention does not impair the overall efficiency of the process, as would be expected from the apparent reduction in capacity of the apparatus, but actually produces an improvement therein. There is no violent reaction at 87° C. such as occurs when sulfuric acid is used as a catalyst for an entire new batch. The isocytosine may be added in a single batch which is again a decided advantage. A decrease of some 15-18% may be made in the amount of phosphorus oxychloride used without any noticeable decrease in yield. Because of the improved conditions under which the chlorination takes place, yields which actually are 3–5% higher than previously obtainable are obtained.

Although theoretical considerations indicate that for each batch a mol ratio of sulfuric acid to isocytosine of about 1:4 is necessary, it has been found that in practicing the process of the present invention this can be very greatly reduced without adversely affecting the yield. Excellent results are obtained when the mol ratio of sulfuric acid to isocytosine is as low as 1:8. It is necessary to add only enough sulfuric acid in each batch to bring the ratio of the total amount of "acid-formed" catalyst in the reaction vessel to the unreacted isocytosine up to about 1:8. Since a greatly reduced amount of acid is added, the total amount of heat generated by the exothermic reaction which produces the additional "acid-formed" catalyst is greatly reduced, thereby accounting for the successful operation. The proportions of 1:8 are not wholly critical and may be varied somewhat if necessary. However, when the ratio is appreciably decreased, the yield also begins to decrease. On the other hand, the use of appreciably more than this amount tends to reintroduce the objectionable features noted above.

Finally, but not the least important advantage of the present invention is the condition in which the 2-amino-4-chloropyrimidine is obtained. Instead of the hard glassy product noted above as being the normal characteristic of an attempt to use sulfuric acid as the catalyst, the product is obtained as a fluid slurry which is easily handled. In addition, the slurry is particularly free, as compared with previous processes, from sulfonated by-products.

This freedom from by-products is particularly noticeable when the next step in the manufacture of sulfanilamidopyrimidines is considered. The product of the chlorinating step is usually taken as a wet presscake and reslurried for the reduction. The yield is usually estimated from the weight of the presscake. Since the latter includes the by-products which not only do not constitute desirable product but actually interfere with the reduction by poisoning the catalyst, the critical measure of success in the chlorinating operation is not the amount of presscake obtained but the amount of 2-aminopyrimidine that can be obtained therefrom. In the present process, on the basis of isocytosine fed, the yield is increased some 10–12% over that previously obtainable.

The reaction is not particularly critical as to the amount of reacted mixture from the previous batch which is retained. From about 25–50% is found to be satisfactory in most cases. Since the more material that is retained, the greater will be the reduction in the capacity of the apparatus, it is preferable to use the smallest amount which will insure a smooth reaction. This normally requires about 30%, if equal amounts of isocytosine are reacted in each batch. Slightly more or less may be used if the conditions permit or require it. For example, if any batch involves an appreciably different amount of isocytosine than was used in the previous run, a suitable adjustment should be made.

The invention will be described in greater detail in conjunction with the following specific examples, which are meant to be merely illustrative and do not in any way limit the invention. The parts are by weight unless otherwise noted.

*Example 1*

To 2.63 parts of a previous batch containing 2-amino-4-chloropyrimidine equivalent to 1 part of isocytosine was added at about 55° C., 1 part of isocytosine, 1.73 parts of phosphorus oxychloride and 0.11 parts of sulfuric acid monohydrate while the whole was being agitated. The mixture was then heated to 90° C. and maintained at about 90–94° C. for 1¼ hours. Half the mixture, i. e. 2.63 parts, was drowned in ice water at 2° C. to 4° C. and neutralized with ammonia to a pH of 7 to 7.5. The temperature was then raised to about 15° C. with the gradual addition of sufficient ammonia to keep the pH at about 7.5. The 2-amino-4-chloropyrimidine was filtered, washed, and dried. The yield was 1.08 parts or 93% of theory based on the isocytosine.

*Example 2*

A sample of 2-amino-4-chloropyrimidine presscake obtained according to the procedure of Example 1 and containing 120 parts of real 2-amino-4-chloropyrimidine was dechlorinated using the quantities and procedure given in U. S. Patent 2,344,707. The yield of 2-aminopyrimidine was 74.5 parts or 77.8% of theory based on the isocytosine.

Example 3

29 parts of chlorosulfonic acid was added to 308 parts of phosphorus oxychloride followed by 111 parts of isocytosine with agitation. The mixture was heated at 90–95° C. for 5 hours and then drowned in ice. The mixture was neutralized with ammonia at 10° C. to a pH of 7–8 giving a final volume of 3000 cc. The precipitate of 2-amino-4-chloropyrimidine was filtered off, washed with water until free of chlorides, and dried. The yield was 120 parts or 93% of theory based on the isocytosine.

Example 4

A sample of the 2-amino-4-chloropyrimidine presscake obtained according to Example 3 and containing 120 parts of real 2-amino-4-chloropyrimidine was dechlorinated using the quantities and procedure given in U. S. Patent 2,344,707. The yield of 2-aminopyrimidine was 62.6 parts or 66% of theory based on the isocytosine. It will be seen that this compares very unfavorably with the product obtained in Example 2.

Example 5

To 599.2 parts of the previous batch of reaction mixture, representing 200 parts of isocytosine, was added 525 parts of phosphorus oxychloride, 66 parts of 100% sulfuric acid and 300 parts of isocytosine. The reaction mixture was then heated immediately to about 90° C., held at 90–92° C. for 2 hours, and then cooled to 60° C. 889 parts (or 60%) of the product was drowned in an ice and water mixture at 0° C. to 5° C., then neutralized with ammonia to about pH 8 while holding the temperature at 0° to 20° C. The 2-amino-4-chloropyrimidine was filtered and washed. The yield was 89% of theory.

We claim:

1. In a method of producing 2-aminopyrimidine by heating a reaction mixture of isocytosine, phosphorus oxychloride and an "acid-formed" catalyst to temperatures above that at which the catalyst is normally formed in the presence of isocytosine by a violent exothermic reaction between phosphorous oxychloride and sulfuric acid monohydrate, isolating the product and reducing the isolated product to 2-aminopyrimidine, the improvement which comprises the steps of forming an amount of substantially fully reacted reaction mixture; adding thereto unreacted materials comprising phosphorous oxychloride, isocytosine and sulfuric acid monohydrate; raising the temperature of the resultant mixture to about 87° C., whereby an exothermic reaction is initiated, the ratio of the total unreacted material to the amount of reacted reaction mixture being so chosen that the total heat generated by the exothermic reaction is insufficient to raise the temperature of the entire mass to above 95° C.; maintaining the temperature of the mixture at about 87°–95° C. until chlorination of the isocytosine is substantially complete; and withdrawing from the reacted mixture all but that amount of reacted mixture required for the next batch.

2. A process according to claim 1 in which a mixture of the materials to be reacted is made at temperatures less than about 85° C. and the mixture is then heated to about 90–95° C. for a sufficient time to substantially complete the reaction between phosphorus oxychloride and isocytosine.

3. A process according to claim 1 in which the mol ratio of the acid and isocytosine in the materials added to the retained material does not exceed about 1:8.

4. A process according to claim 1 in which the mol ratio of the equivalents of phosphorus oxychloride and isocytosine in the materials added to the retained portion does not exceed about 5:4.

5. A process according to claim 1 in which the material retained from the previous reaction constitutes 25–50% of the mixture to be heated.

ERWIN KUH.
THOMAS W. CLAPPER.

REFERENCES CITED

The following references are of record in the file of this patent:

UNITED STATES PATENTS

| Number | Name | Date |
| --- | --- | --- |
| 2,065,400 | Salzberg et al. | Dec. 22, 1936 |
| 1,891,415 | Harlow et al. | Dec. 20, 1932 |
| 721,961 | Marckwald | Mar. 3, 1903 |
| 1,888,713 | Britton et al. | Nov. 22, 1932 |
| 2,242,079 | Kuh | May 13, 1941 |
| 2,224,811 | English | Dec. 10, 1941 |